United States Patent
Otsuka et al.

(10) Patent No.: US 12,338,047 B2
(45) Date of Patent: Jun. 24, 2025

(54) MULTI-LAYER CONTAINER, METHOD FOR PRODUCING SAME, AND METHOD FOR PRODUCING RECLAIMED POLYESTER

(71) Applicant: Mitsubishi Gas Chemical Company, Inc., Tokyo (JP)

(72) Inventors: Kosuke Otsuka, Hiratsuka (JP); Masayuki Daito, Hiratsuka (JP); Takumi Yamada, Hiratsuka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 283 days.

(21) Appl. No.: 18/022,034

(22) PCT Filed: Aug. 11, 2021

(86) PCT No.: PCT/JP2021/029631
§ 371 (c)(1),
(2) Date: Feb. 17, 2023

(87) PCT Pub. No.: WO2022/039086
PCT Pub. Date: Feb. 24, 2022

(65) Prior Publication Data
US 2023/0303299 A1    Sep. 28, 2023

(30) Foreign Application Priority Data
Aug. 20, 2020  (JP) ................. 2020-139566

(51) Int. Cl.
*B65D 65/40* (2006.01)
*B29C 49/06* (2006.01)
*B29C 49/22* (2006.01)
*B32B 27/08* (2006.01)
*B32B 27/20* (2006.01)
*B32B 27/34* (2006.01)
*B32B 27/36* (2006.01)
*B29K 67/00* (2006.01)
*B29K 77/00* (2006.01)
*B29L 31/00* (2006.01)

(52) U.S. Cl.
CPC .............. *B65D 65/40* (2013.01); *B29C 49/06* (2013.01); *B29C 49/22* (2013.01); *B32B 27/08* (2013.01); *B32B 27/20* (2013.01); *B32B 27/34* (2013.01); *B32B 27/36* (2013.01); *B29K 2067/00* (2013.01); *B29K 2077/00* (2013.01); *B29K 2995/0058* (2013.01); *B29L 2031/712* (2013.01); *B32B 2250/24* (2013.01); *B32B 2307/4026* (2013.01); *B32B 2307/714* (2013.01); *B32B 2439/00* (2013.01)

(58) Field of Classification Search
CPC ...... B65D 65/40; B65D 1/0207; B29C 49/22; B32B 27/20; B32B 27/34; B32B 27/36; B32B 2250/24; B32B 2307/4026; B32B 2307/714; B32B 2439/00; B32B 2250/42; B32B 2305/70; B32B 2437/04; B32B 2439/70; B29K 2067/00; B29K 2077/00; B29K 2995/0058; C08K 2201/014; C08K 5/08; C08K 5/0041; C08K 5/23; B29L 2031/712; B29B 17/02; C08G 69/26; C08G 63/183; C08G 63/78; C08G 63/80; Y02W 30/62

See application file for complete search history.

(56) References Cited

U.S. PATENT DOCUMENTS

| | | |
|---|---|---|
| 2005/0032947 A1 | 2/2005 | Takahashi et al. |
| 2010/0233401 A1 | 9/2010 | Mitadera et al. |
| 2016/0001914 A1 | 1/2016 | Yamamoto |
| 2017/0267436 A1 | 9/2017 | Yamamoto |
| 2018/0072844 A1 | 3/2018 | Otsuka et al. |
| 2021/0046744 A1 | 2/2021 | Miyabe |
| 2021/0229404 A1 | 7/2021 | Miyabe |
| 2021/0237414 A1 | 8/2021 | Miyabe |

FOREIGN PATENT DOCUMENTS

| | | |
|---|---|---|
| CN | 1590439 A | 3/2005 |
| CN | 101360601 A | 2/2009 |
| EP | 0734413 A1 | 10/1996 |
| JP | S57-123051 A | 7/1982 |
| JP | 2004-359914 A | 12/2004 |
| JP | 2010-254811 A | 11/2010 |
| JP | 2015-024828 A | 2/2015 |
| JP | 2016-78373 A | 5/2016 |
| JP | 2018-188177 A | 11/2018 |
| TW | 201441304 A | 11/2014 |
| TW | 201613764 A | 4/2016 |
| TW | 201945197 A | 12/2019 |
| TW | 201945205 A | 12/2019 |
| TW | 201945250 A | 12/2019 |
| WO | 2017/057463 A1 | 10/2017 |

OTHER PUBLICATIONS

International Search Report for PCT/JP2021/029631, mailed Oct. 5, 2021, and English Translation submitted herewith (4 pages).

*Primary Examiner* — James C Yager
(74) *Attorney, Agent, or Firm* — Fitch, Even, Tabin and Flannery LLP

(57) ABSTRACT

Provided is a multilayer container having a polyester layer containing a polyester resin (X), and a polyamide layer containing a polyamide resin (Y) and a yellowing inhibitor (A). The content of the polyamide resin (Y) is from 0.05 to 7.0 mass % relative to the total amount of all polyamide layers and all polyester layers. The yellowing inhibitor (A) is a dye. The content of the yellowing inhibitor (A) is from 400 to 800 ppm relative to the polyamide layer. An L* of the multilayer container is 87.5 or greater.

17 Claims, No Drawings

MULTI-LAYER CONTAINER, METHOD FOR PRODUCING SAME, AND METHOD FOR PRODUCING RECLAIMED POLYESTER

CROSS-REFERENCE TO RELATED APPLICATIONS

This application is a U.S. national phase application filed under 35 U.S.C. § 371 of International Application Number PCT/JP2021/029631 filed Aug. 11, 2021, designating the United States, which claims priority from Japanese Application Number 2020-139566, filed Aug. 20, 2020.

FIELD OF THE INVENTION

The present invention relates to a multilayer container, a method for manufacturing the same, and a method for manufacturing a recycled polyester.

BACKGROUND OF THE INVENTION

Aromatic polyester resins obtained using an aromatic dicarboxylic acid compound and an aliphatic diol compound as monomers exhibit merits such as transparency, mechanical performance, melt stability, solvent resistance, fragrance retention, gas barrier properties, and recyclability. Therefore, aromatic polyester resins such as polyethylene terephthalate (PET) are widely used in various packaging materials such as films, sheets, and hollow containers. Polyester resins have high gas barrier properties, but their gas barrier properties are not necessarily sufficient for applications requiring an even higher level of gas barrier properties for gases such as oxygen and carbon dioxide. Therefore, as a means to improve the gas barrier properties of polyester resins, aluminum oxide or silicon oxide is vapor deposited onto a molded body or packaging container made from a polyester resin, or a resin having high gas barrier performance is applied and laminated onto a molded body or packaging container made from a polyester resin, or is melted and mixed therewith.

Examples of the gas barrier resins include polyamide resins such as nylon 6 and nylon 66, and ethylene-vinyl alcohol copolymers. Among the polyamide resins, polyxylylene adipamide obtained by polymerizing a diamine component mainly composed of xylylene diamine and a dicarboxylic acid component mainly composed of adipic acid exhibits excellent gas barrier properties. Polyxylylene adipamide has high gas barrier properties, and the glass transition temperature, melting point, and crystallinity of polyxylylene adipamide are similar to those of polyethylene terephthalate, which is a widely used polyester resin, and therefore polyxylylene adipamide is easily laminated onto and melt-mixed with a polyester resin. For this reason, polyxylylene adipamide is very suitable as a material for improving the gas barrier properties of polyester resins.

However, in a polyester resin composition containing a polyamide, yellowing due to heat history is more likely to proceed than with polyester alone. As a result, yellowing occurs particularly in a recycling process in which containers are collected and the resin is reused. This is a factor that reduces the product value of packaging containers, and thus measures for suppressing yellowing are being investigated.

For example, Patent Document 1 discloses a multilayer container that includes a polyester resin composition layer containing a polyester resin and an amino group-containing compound having a yellowing-suppression capability, and a polyamide resin layer containing a polyamide resin, and also discloses a method for manufacturing recycled polyester.

Patent Document 2 discloses a resin composition that contains a polyester resin recycled from a polyester resin molded article, a resin other than a polyester, and a specific amount of pigment for the purpose of improving transparency due to yellowing of recycled PET and improving moldability, heat resistance, and strength and elongation characteristics.

CITATION LIST

Patent Documents

Patent Document 1: WO 2017/057463
Patent Document 2: JP 2004-359914 A

SUMMARY OF INVENTION

A container of a polyester resin containing a polyamide as described above tends to easily yellow, and a recycled polyester obtained by recycling such a container also exhibits a yellow hue. As a method for eliminating such yellowing, for example, it is conceivable to add a colorant such as a blue pigment, which is an opposite color (complementary color), as described in Patent Document 2.

In order to reduce the yellow color, a colorant that suppresses yellowing must be added to the container serving as the raw material of the recycled polyester, but blue is conspicuous and thus results in a container that is inferior in colorlessness and in a decrease in design freedom.

On the other hand, even amongst containers of a polyester resin containing a polyamide, a multilayer container obtained by laminating a layer containing a polyamide resin to a container of a polyester resin exhibits excellent barrier properties because the polyamide resin layer functions as a barrier layer.

Thus, a demand exists for a multilayer container of a polyester resin, from which a recycled polyester can be obtained with the blue color effectively eliminated, the multilayer container thereof having a polyamide layer with minimal blueness.

Therefore, an object of the present invention is to provide a multilayer container from which can be obtained a recycled polyester excelling in colorlessness with low yellow chromaticity, the multilayer container also excelling in colorlessness with minimal blueness, and to provide a method for manufacturing a recycled polyester excelling in colorlessness.

As a result of diligent investigation in view of the above-described problems, the present inventors discovered that a multilayer container having a specific L* value and including a polyester layer and a polyamide layer containing a polyamide resin and a specific amount of a dye, which is a yellowing inhibitor, can solve the problems described above, and thereby the present inventors arrived at the present invention.

The present invention provides the following aspects [1] to [17].

[1] A multilayer container having:
a polyester layer containing a polyester resin (X); and
a polyamide layer containing a polyamide resin (Y) and a yellowing inhibitor (A).
wherein
a content of the polyamide resin (Y) is from 0.05 to 7.0 mass % relative to a total amount of all polyamide layers and all polyester layers, the yellowing inhibitor (A) is a dye,
the content of the yellowing inhibitor (A) is from 400 to 800 ppm relative to the polyamide layer, and
an L* value of the multilayer container is 87.5 or greater.

[2] The multilayer container according to [1], wherein the polyester resin (X) includes a constituent unit derived from a dicarboxylic acid and a constituent unit derived from a diol, 80 mol % or more of the constituent unit derived from a dicarboxylic acid being a constituent unit derived from terephthalic acid, and 80 mol % or more of the constituent unit derived from a diol being a constituent unit derived from ethylene glycol.

[3] The multilayer container according to [1] or [2], wherein the polyamide resin (Y) includes a constituent unit derived from a diamine and a constituent unit derived from a dicarboxylic acid, 80 mol % or more of the constituent unit derived from a diamine being a constituent unit derived from xylylene diamine, and 80 mol % or more of the constituent unit derived from a dicarboxylic acid being a constituent unit derived from adipic acid.

[4] The multilayer container according to any one of [1] to [3], wherein the yellowing inhibitor (A) is an anthraquinone-based dye.

[5] The multilayer container according to any one of [1] to [4], wherein the polyamide layer further contains a greening inhibitor (B).

[6] The multilayer container according to [5], wherein the greening inhibitor (B) is at least one selected from the group consisting of anthraquinone-based dyes and azo-based dyes.

[7] The multilayer container according to any one of [1] to [6], wherein the polyester layer substantially does not contain a reheating agent.

[8] The multilayer container according to any one of [1] to [7], wherein the multilayer container is a hollow multilayer container.

[9] The multilayer container according to any one of [1] to [8], wherein the multilayer container has a 2 to 5 layer structure, and an outermost layer is a polyester layer.

[10] The multilayer container according to any one of [1] to [9], wherein the multilayer container has a 3 to 5 layer structure, and the outermost layer and the innermost layer are polyester layers.

[11] A method for manufacturing a multilayer container, the multilayer container having
a polyester layer containing a polyester resin (X), and
a polyamide layer containing a polyamide resin (Y) and a yellowing inhibitor (A),
the content of the polyamide resin (Y) being from 0.05 to 7.0 mass % relative to a total amount of all polyamide layers and all polyester layers,
the yellowing inhibitor (A) being a dye,
a content of the yellowing inhibitor (A) being from 400 to 800 ppm relative to the polyamide layer, and
an L* value of the multilayer container being 87.5 or greater,
the manufacturing method including:
Step 1: mixing the polyamide resin (Y) and the yellowing inhibitor (A) to prepare a polyamide resin mixture,
Step 2: co-injection molding the polyamide resin mixture and a polyester resin composition containing the polyester resin (X), and thereby obtaining a multilayer preform; and
Step 3: blow molding the multilayer preform.

[12] The method according to [11], wherein in step 1, the polyamide resin (Y) having a pellet shape and the yellowing inhibitor (A) are mixed at a temperature of 230° C. or lower.

[13] The method according to or [12], wherein in step 1, a greening inhibitor (B) is further mixed.

[14] The method according to [13], wherein in step 1, the polyamide resin or polyester resin, the yellowing inhibitor (A), and the greening inhibitor (B) are kneaded and then mixed with the polyamide resin (Y).

[15] The method according to any one of [11] to [14], wherein the yellowing inhibitor (A) is a powder, a dispersion, or a solution.

[16] A method for manufacturing a recycled polyester, the method including recovering polyester from the multilayer container according to any one of [1] to [10].

[17] The method according to [16], wherein one or more steps selected from crystallization and solid phase polymerization are implemented after recovering the polyester.

According to the present invention, a multilayer container from which a recycled polyester excelling in colorlessness with low yellow chromaticity can be obtained, the multilayer container also excelling in colorlessness with minimal blueness, and a method for manufacturing a recycled polyester excelling in colorlessness can be provided.

DESCRIPTION OF EMBODIMENTS

Multilayer Container

A multilayer container of the present invention is a multilayer container having: a polyester layer containing a polyester resin (X); and a polyamide layer containing a polyamide resin (Y) and a yellowing inhibitor (A). The content of the polyamide resin (Y) is from 0.05 to 7.0 mass % relative to a total amount of all polyamide layers and all polyester layers. The yellowing inhibitor (A) is a dye. The content of the yellowing inhibitor (A) is from 400 to 800 ppm relative to the polyamide layer. An L* value of the multilayer container is 87.5 or greater.

The "total amount of all polyamide layers and all polyester layers" is the total mass of all polyamide layers and all polyester layers configuring the multilayer container, and when a plurality of layers of each are present, it is the total amount of all of these layers.

Polyester Layer

The polyester layer contains a polyester resin (X).

Polyester Resin (X)

The polyester resin (X) contained in the polyester layer is preferably a polycondensation polymer of a dicarboxylic acid and a diol, and preferably includes a constituent unit derived from a dicarboxylic acid (hereinafter, also referred to as a "dicarboxylic acid unit") and a constituent unit derived from a diol (hereinafter, also referred to as a "diol unit").

Examples of dicarboxylic acid units include constituent units derived from aromatic dicarboxylic acids, constituent units derived from alicyclic dicarboxylic acids, and constituent units derived from aliphatic dicarboxylic acids, and constituent units derived from aromatic dicarboxylic acids are preferred.

Examples of aromatic dicarboxylic acids include terephthalic acid, isophthalic acid, orthophthalic acid, biphenyl dicarboxylic acid, diphenyl ether dicarboxylic acid, diphenylsulfone dicarboxylic acid, diphenylketone dicarboxylic acid, 2,6-naphthalene dicarboxylic acid, 1,4-naphthalene dicarboxylic acid, and 2,7-naphthalene dicarboxylic acid. From perspectives of cost and manufacturing ease, terephthalic acid, isophthalic acid, orthophthalic acid, naphthalene dicarboxylic acid, and 4,4'-biphenyl dicarboxylic acid are preferable, and terephthalic acid, isophthalic acid, and naphthalene dicarboxylic acid are more preferable, and from the perspective of moldability, terephthalic acid and isophthalic acid are further preferable, and terephthalic acid is even more preferable.

When the multilayer container of the present invention is to be recycled, the multilayer container may be melt-kneaded with a typical monolayer container made of a polyester resin. Since the multilayer container of the present invention includes a unit derived from terephthalic acid as a dicarboxylic acid unit, miscibility of the multilayer container with a typical monolayer container is favorable, and good recyclability is obtained.

As the aromatic dicarboxylic acid, a sulfophthalic acid and a metal sulfophthalate may be used. The metal sulfophthalate is a metal salt of a sulfophthalic acid, and examples of the metal atom include alkali metals and alkaline earth metals.

Examples of the alicyclic dicarboxylic acid include cyclohexane dicarboxylic acid, norbornene dicarboxylic acid, and tricyclodecane dicarboxylic acid.

Examples of the aliphatic dicarboxylic acid include malonic acid, succinic acid, adipic acid, azelaic acid, and sebacic acid.

Examples of the diol unit include constituent units derived from aliphatic diols, constituent units derived from alicyclic diols, and constituent units derived from aromatic diols, and constituent units derived from aliphatic diols are preferable.

Examples of the aliphatic diols include ethylene glycol, 2-butene-1,4-diol, trimethylene glycol, tetramethylene glycol, hexamethylene glycol, neopentyl glycol, methylpentanediol, and diethylene glycol. Among these, ethylene glycol is preferable, and ethylene glycol is more preferable.

Examples of the alicyclic diols include cyclohexane dimethanol, isosorbide, spiroglycol, 2,2,4,4-tetramethyl-1,3-cyclobutanediol, norbornene dimethanol and tricyclodecane dimethanol.

Examples of aromatic diols include bisphenol compounds and hydroquinone compounds.

The polyester resin (X) may have a constituent unit derived from a hydroxycarboxylic acid.

Examples of hydroxycarboxylic acids include aliphatic hydroxycarboxylic acids, alicyclic hydroxycarboxylic acids, and aromatic hydroxycarboxylic acids.

Examples of the aliphatic hydroxycarboxylic acids include 10-hydroxyoctadecanoic acid, lactic acid, hydroxyacrylic acid, 2-hydroxy-2-methylpropionic acid and hydroxybutyric acid.

Examples of the alicyclic hydroxycarboxylic acids include hydroxymethyl cyclohexane carboxylic acid, hydroxymethyl norbornene carboxylic acid, and hydroxymethyl tricyclodecane carboxylic acid.

Examples of the aromatic hydroxycarboxylic acids include hydroxybenzoic acid, hydroxytoluic acid, hydroxynaphthoic acid, 3-(hydroxyphenyl)propionic acid, hydroxyphenylacetic acid, and 3-hydroxy-3-phenylpropionic acid.

The polyester resin (X) may have a constituent unit derived from a monofunctional compound and a constituent unit derived from a polyfunctional compound.

Examples of the monofunctional compound include monocarboxylic acids and monoalcohols, and specifically include aromatic monocarboxylic acids, aliphatic monocarboxylic acids, aromatic monoalcohols, aliphatic monoalcohols, and alicyclic monoalcohols.

Examples of the polyfunctional compound include aromatic polycarboxylic acids, alicyclic polycarboxylic acids, aliphatic polyhydric alcohols, alicyclic polyhydric alcohols, and esters thereof.

The polyester resin (X) preferably has a constituent unit derived from a dicarboxylic acid containing a terephthalic acid-derived constituent unit, and a constituent unit derived from a diol containing an ethylene glycol-derived constituent unit; more preferably has a constituent unit derived from a dicarboxylic acid containing 80 mol % or more of a terephthalic acid-derived constituent unit, and a constituent unit derived from a diol containing 80 mol % or more of an ethylene glycol-derived constituent unit; even more preferably has a constituent unit derived from a dicarboxylic acid containing 90 mol % or more of a terephthalic acid-derived constituent unit, and a constituent unit derived from a diol containing 90 mol % or more of an ethylene glycol-derived constituent unit; and yet even more preferably has a constituent unit derived from a dicarboxylic acid containing 98 mol % or more of a terephthalic acid-derived constituent unit, and a constituent unit derived from a diol containing substantially 100 mol % of an ethylene glycol-derived constituent unit.

Specific examples of the polyester resin (X) include polyethylene terephthalate (PET).

The polyethylene terephthalate (PET) may include a constituent unit derived from an aromatic dicarboxylic acid other than terephthalic acid. The aromatic dicarboxylic acid other than terephthalic acid is preferably one or more selected from isophthalic acid, orthophthalic acid, naphthalene dicarboxylic acid, and 4,4'-biphenyldicarboxylic acid. These compounds are inexpensive, and a copolymerized polyester resin containing these compounds is easily produced.

Among these, isophthalic acid and naphthalene dicarboxylic acid are preferable, and isophthalic acid is more preferable. The polyethylene terephthalate containing a constituent unit derived from isophthalic acid excels in moldability, and is also excellent from the standpoint of preventing whitening of a molded article due to the low crystallization rate. In addition, a polyethylene terephthalate containing a constituent unit derived from naphthalene dicarboxylic acid increases the glass transition point of the resin, improves the heat resistance, and absorbs ultraviolet rays, and therefore, such polyethylene terephthalate is suitably used in the manufacturing of a multilayer container requiring resistance to ultraviolet rays. Note that a 2,6-naphthalene dicarboxylic acid component is preferable as the naphthalene dicarboxylic acid because it is easy to be produced and is highly economical.

When the polyethylene terephthalate contains a constituent unit derived from an aromatic dicarboxylic acid other than terephthalic acid, the proportion of the constituent unit derived from an aromatic dicarboxylic acid other than terephthalic acid is preferably from 1 to 20 mol %, more preferably from 1 to 10 mol %, and even more preferably from 1 to 5 mol % of the dicarboxylic acid units.

Note that one type of polyester resin (X) may be used alone, or two or more types may be combined and used.

The polyester resin (X) can be produced through a known method such as direct esterification or transesterification.

The intrinsic viscosity of the polyester resin (X) is preferably from 0.5 to 2.0 dL/g, and more preferably from 0.6 to 1.5 dL/g. When the intrinsic viscosity is 0.5 dL/g or higher, the mechanical properties of the container are excellent.

Note that the intrinsic viscosity is measured by dissolving the polyester resin in a mixed solvent of phenol/1,1,2,2- tetrachloroethane (=6/4 mass ratio) to prepare 0.2, 0.4, and 0.6 g/dL solutions, and then measuring the intrinsic viscosity at 25° C. using an automatic viscosity measuring apparatus (Viscotek, available from Malvern Instruments Limited).

Other Components

The polyester layer may contain other components. Examples of the other components include thermal stabilizers, photostabilizers, moisture-proof agents, waterproofing agents, lubricants, and spreading agents.

The polyester layer may contain, within a range that does not impair the effects of the present invention, a resin other than polyester resin (X) that is a main component. The content of the polyester resin (X) is preferably from 80 to 100 mass %, and more preferably from 90 to 100 mass %, relative to the amount of resin in the entire polyester layer.

On the other hand, preferably, the polyester layer substantially does not contain a reheating agent. Specifically, even when the polyester layer contains a reheating agent, the content of the reheating agent in relation to the polyester layer is preferably 5 ppm or less, more preferably 3 ppm or less, even more preferably 1 ppm or less, and still even more preferably 0 ppm, and not containing a reheating agent is yet even more preferable.

The reheating agent absorbs infrared light during molding and generates heat, and thereby improves the heating speed and manufacturing speed. Therefore, the reheating agent may also be referred to as an infrared absorbing agent or a reheat additive. Examples of the reheating agent include carbon black.

Polyamide Layer

The polyamide layer includes a polyamide resin (Y) and a yellowing inhibitor (A). Further, the content of the polyamide resin (Y) contained in the polyamide layer is from 0.05 to 7.0 mass % relative to the total amount of all polyamide layers and all polyester layers, and the content of the yellowing inhibitor (A) is from 400 to 800 ppm relative to the polyamide layer.

Providing a polyamide layer enables a multilayer container having high gas barrier properties. Therefore, penetration of oxygen from the outside can be prevented and dissipation of carbon dioxide from a carbonated beverage to the outside air can also be suppressed. Also, the polyester resin can be more easily separated and recovered while maintaining favorable moldability by using the polyamide layer.

Furthermore, it is conceivable that yellowing can be effectively suppressed by including the yellowing inhibitor (A) in a polyamide layer containing nitrogen, which is likely to cause yellowing of a recycled resin. In particular, it is conceivable that since an amount of the yellowing inhibitor corresponding to the amount of the polyamide resin remaining in the polyester resin recovered at the time of recycling remains, an appropriate amount of the yellowing inhibitor can be contained in the recycled polyester resin, and a colorless recycled polyester can be obtained.

Polyamide Resin (Y)

Examples of the polyamide resin (Y) include xylylene group-containing poly amide resins, nylon 6, nylon 66, nylon 666, nylon 610, nylon 11, nylon 12, and mixtures thereof. Of these, xylylene group-containing polyamide resins are preferable because the gas barrier performance can be improved and the polyamide resin can be easily separated from the polyester layer when recycling. The xylylene group-containing polyamide resin is preferably a polyamide resin containing a constituent unit derived from xylylene diamine.

The xylylene group-containing polyamide resin is obtained by poly condensation of a dicarboxylic acid and a diamine containing a xylylene diamine, and includes a constituent unit derived from a xylylene diamine and a constituent unit derived from a dicarboxylic acid. Furthermore, the xylylene-group containing polyamide resin preferably contains at least 50 mol %, more preferably at least 70 mol %, even more preferably from 80 to 100 mol %, and yet even more preferably from 90 to 100 mol % of xylylene diamine-derived constituent units from amongst the diamine-derived constituent units (diamine units).

The xylylene diamine is preferably meta-xylylene diamine, para-xylylene diamine, or both, and is more preferably meta-xylylene diamine. Furthermore, preferably at least 50 mol %, more preferably at least 70 mol %, even more preferably from 80 to 100 mol %, and yet even more preferably from 90 to 100 mol % of the diamine units constituting the xylylene group-containing polyamide resin are constituent units derived from meta-xylylene diamine. When the amount of constituent units derived from meta-xylylene diamine in the diamine units is within the aforementioned range, the gas barrier properties of the polyamide resin are further improved.

The diamine unit in the xylylene group-containing polyamide resin may include only a constituent unit derived from xylylene diamine, or may include a constituent unit derived from diamines other than xylylene diamine. Here, examples of diamines other than xylylene diamine include aliphatic diamines having a linear or branched structure, such as ethylene diamine, tetramethylene diamine, pentamethylene diamine, 2-methylpentane diamine, hexamethylene diamine, heptamethylene diamine, octamethylene diamine, nonamethylene diamine, decamethylene diamine, dodecamethylene diamine, 2,2,4-trimethyl-hexamethylene diamine, and 2,4,4-trimethyl-hexamethylene diamine; alicyclic diamines, such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis(aminomethyl)tricyclodecane; and diamines having an aromatic ring, such as bis(4-aminophenyl)ether, paraphenylene diamine, and bis(aminomethyl)naphthalene.

Examples of compounds that can configure the dicarboxylic acid unit in the xylylene group-containing polyamide resin include $C_{4-20}$ α,ω-linear aliphatic dicarboxylic acids, such as succinic acid, glutaric acid, adipic acid, pimelic acid, suberic acid, azelaic acid, sebacic acid, undecanedioic acid, and dodecanedioic acid; alicyclic dicarboxylic acids, such as 1,4-cyclohexane dicarboxylic acid; other aliphatic dicarboxylic acids, such as dimer acids; and aromatic dicarboxylic acids such as terephthalic acid, isophthalic acid, orthophthalic acid, xylylene dicarboxylic acid, and naphthalene dicarboxylic acid, and $C_{4-20}$ α,ω-linear aliphatic dicarboxylic acids are preferable, adipic acid and sebacic acid are more preferable, and from the perspective of obtaining favorable barrier performance, adipic acid is even more preferable.

Furthermore, the xylylene group-containing poly amide resin contains, of the dicarboxylic acid-derived constituent units (dicarboxylic acid units), adipic acid-derived constituent units at an amount of preferably at least 50 mol %, more preferably at least 70 mol %, even more preferably from 80 to 100 mol %, and yet even more preferably from 90 to 100 mol %.

In other words, the polyamide resin (Y) preferably has a constituent unit derived from a diamine and a constituent unit derived from a dicarboxylic acid with 50 mol % or more of the constituent unit derived from a diamine being a constituent unit derived from xylylene diamine and 50 mol % or more of the constituent unit derived from a dicarboxylic acid being a constituent unit derived from adipic acid, more preferably has a constituent unit derived from a diamine and a constituent unit derived from a dicarboxylic acid with 80 mol % or more of the constituent unit derived from a diamine being a constituent unit derived from xylylene diamine and 80 mol % or more of the constituent unit derived from a dicarboxylic acid being a constituent unit derived from adipic acid, and even more preferably has a constituent unit derived from a diamine and a constituent unit derived from a dicarboxylic acid with 90 mol % or more of the constituent unit derived from a diamine being a constituent unit derived from xylylene diamine and 90 mol % or more of the constituent unit derived from a dicarboxylic acid being a constituent unit derived from adipic acid.

The xylylene diamine is preferably meta-xylylene diamine.

Furthermore, the remaining dicarboxylic acid units excluding adipic acid are preferably constituent units derived from $C_{4-20}$ α,ω-linear aliphatic dicarboxylic acids.

Furthermore, examples of the preferred xylylene group-containing polyamide resin are polyamide resins in which 70 mol % or more of the diamine units are constituent units derived from xylylene diamine (preferably meta-xylylene diamine), from 70 to 99 mol % of the dicarboxylic acid units are constituent units derived from adipic acid, and from 1 to 30 mol % of the dicarboxylic acid units are constituent units derived from isophthalic acid. The polyamide resin is preferably a polyamide resin in which at least 80 mol % of the diamine units are constituent units derived from a meta-xylylenediamine (preferably, meta-xylylenediamine), from 80 to 99 mol % of the dicarboxylic acid units are constituent units derived from adipic acid, and from 1 to 20 mol % of the dicarboxylic acid units are constituent units derived from isophthalic acid, and is more preferably a poly amide resin in which at least 90 mol % of the diamine units are constituent units derived from a meta-xylylenediamine (preferably, meta-xylylenediamine), from 80 to 99 mol % of the dicarboxylic acid units are constituent units derived from adipic acid, and from 1 to 20 mol % of the dicarboxylic acid units are constituent units derived from isophthalic acid.

Adding an isophthalic acid unit as a dicarboxylic acid unit reduces the melting point, and as a result, the molding processing temperature can be lowered, and therefore thermal deterioration during molding can be suppressed, and stretching moldability is improved by delaying the crystallization time.

Furthermore, besides the above-mentioned diamines and dicarboxylic acids, lactams such as ε-caprolactam and laurolactam; aliphatic aminocarboxylic acids such as aminocaproic acid and aminoundecanoic acid; and aromatic aminocarboxylic acids such as p-aminomethylbenzoic acid can also be used as components constituting the xylylene group-containing poly amide resin, within a range that does not impair the effect of the present invention.

The xylylene group-containing polyamide resin is preferably produced by a polycondensation reaction (hereinafter, also referred to as "melt polycondensation") in a molten state. For example, the xylylene group-containing polyamide resin is preferably produced by a method in which a nylon salt composed of a diamine and a dicarboxylic acid is subjected to a temperature increase using a pressurization method in the presence of water, and is polymerized in a molten state while removing the water. In addition, the xylylene group-containing polyamide resin may also be produced by a method in which the diamine is added directly to molten dicarboxylic acid, and the contents are polycondensed under atmospheric pressure. In this case, in order to maintain the reaction system in a uniform liquid state, preferably, the diamine is continuously added to the dicarboxylic acid, and during that time, polycondensation is allowed to proceed while increasing the temperature of the reaction system such that the reaction temperature does not fall below the melting points of the produced oligoamide and poly amide. Furthermore, the molecular weight of the xylylene group-containing polyamide can also be increased by further subjecting the product obtained through melt polycondensation to solid phase polymerization as necessary.

The xylylene group-containing polyamide resin is preferably subjected to polycondensation in the presence of a phosphorus atom-containing compound. When the xylylene group-containing polyamide resin is subjected to polycondensation in the presence of a phosphorus atom-containing compound, the processing stability during melt molding is enhanced, and coloration is readily suppressed.

The phosphorous atom-containing compound is preferably a hypophosphorous acid compound or a phosphorous acid compound, and is more preferably a hypophosphorous acid compound.

The phosphorus atom-containing compound is preferably an organic metal salt, and of these, alkali metal salts are more preferable.

From the perspective of promoting a polymerization reaction and the perspective of preventing coloration, examples of the hypophosphorous acid compound include hypophosphorous acid, metal hypophosphites, metal phenyl phosphonites, ethyl hypophosphite, dimethyl phosphinic acid, phenyl methyl phosphinic acid, phenyl phosphonous acid, and ethyl phenyl phosphonite, and metal hypophosphites are preferable.

Examples of the metal hypophosphites include sodium hypophosphite, potassium hypophosphite, lithium hypophosphite, and calcium hypophosphite, and sodium hypophosphite is more preferable.

Examples of the metal phenyl phosphonites include sodium phenyl phosphonite, potassium phenyl phosphonite, and lithium phenyl phosphonite.

Examples of the phosphorous acid compound include phosphorous acid, pyrophosphorous acid, metal phosphites, metal phenyl phosphonates, triethyl phosphite, triphenyl phosphite, ethyl phosphonic acid, phenyl phosphonic acid, and diethyl phenyl phosphonate.

Examples of metal phosphites include sodium hydrogen phosphite, sodium phosphite, potassium phosphite, and calcium phosphite.

Examples of the metal phenyl phosphonates include sodium ethylphosphonate, potassium ethylphosphonate, sodium phenylphosphonate, potassium phenylphosphonate, and lithium phenylphosphonate.

The phosphorus atom-containing compound may be one type, or two or more types may be used in combination.

Furthermore, polycondensation of the xylylene group-containing polyamide resin is preferably carried out in the presence of a phosphorus atom-containing compound and an alkali metal compound. When the usage amount of phosphorus atom-containing compound is large, there is a concern that the polyamide resin may form a gel. Therefore, from the viewpoint of adjusting the rate of the amidation reaction, an alkali metal compound preferably coexists with the phosphorus atom-containing compound.

Examples of the alkali metal compound include alkali metal hydroxides and alkali metal acetates. Examples of the alkali metal hydroxide include lithium hydroxide, sodium hydroxide, potassium hydroxide, rubidium hydroxide, and cesium hydroxide, and examples of the alkali metal acetate include lithium acetate, sodium acetate, potassium acetate, rubidium acetate, and cesium acetate.

When an alkali metal compound is used in polycondensation of the polyamide resin, from the viewpoint of suppressing the formation of a gel, the usage amount of the alkali metal compound is in a range in which a value obtained by dividing the number of moles of the alkali metal compound by the number of moles of the phosphorus atom-containing compound is preferably from 0.5 to 1, more preferably from 0.55 to 0.95, and even more preferably from 0.6 to 0.9.

The number average molecular weight of the poly amide resin is selected, as appropriate, according to the application and molding method of the multilayer container, but from the perspectives of moldability and strength of the multilayer container, the number average molecular weight is preferably from 10000 to 60000, and more preferably from 11000 to 50000.

Note that the number average molecular weight of the polyamide resin is calculated from the following equation (X).

$$\text{Number average molecular weight} = 2 \times 1000000 / ([\text{COOH}] + [\text{NH}_2]) \quad (X)$$

(Where [COOH] represents the terminal carboxyl group concentration ($\mu$mol/g) in the poly amide resin, and [$NH_2$] represents the terminal amino group concentration ($\mu$mol/g) in the polyamide resin.)

Here, the terminal carboxyl group concentration is a value that is calculated by neutralization titration of a solution of the polyamide in benzyl alcohol with an aqueous sodium hydroxide solution.

From the viewpoint of suppressing yellowing of the recycled polyester, the terminal amino group concentration of the polyamide resin (Y) in the present invention is preferably not greater than 50 $\mu$mol/g, more preferably not greater than 45 $\mu$mol/g, even more preferably not greater than 40 $\mu$mol/g, yet even more preferably not greater than 30 $\mu$mol/g, and particularly preferably not greater than 20 $\mu$mol/g.

The terminal amino group concentration in the polyamide resin (Y) is determined by precisely weighing the polyamide resin, dissolving the polyamide resin in a phenol/ethanol (4/1 by volume) solution under stirring at 20 to 30° C. until the polyamide resin is completely dissolved, and then rinsing the inner wall of the container with 5 mL of methanol under stirring, followed by neutralization titration with a 0.01 mol/L hydrochloric acid aqueous solution.

The method for adjusting the terminal amino group concentration of the polyamide resin (Y) is not particularly limited, but the terminal amino group concentration can be suppressed to a low level through, for example, a method in which the charged ratio (molar ratio) of the diamine and the dicarboxylic acid is adjusted, and a polycondensation reaction is carried out; a method in which a monocarboxylic acid capable of capping an amino group is charged together with the diamine and the dicarboxylic acid, and a poly condensation reaction is carried out; or a method in which the polycondensation reaction is carried out, after which the resultant is reacted with a carboxylic acid capable of capping an amino group.

The content of the polyamide resin (Y) contained in the polyamide layer is from 0.05 to 7.0 mass % relative to the total amount of all polyamide layers and all polyester layers, and from the perspectives of gas barrier properties and suppressing yellowing of the recycled polyester, the content thereof is preferably from 0.5 to 6.0 mass %, more preferably from 1.0 to 5.0 mass %, and even more preferably from 1.5 to 4.5 mass %.

Yellowing Inhibitor (A)

The poly amide layer of the multilayer container includes a yellowing inhibitor (A), and the content of the yellowing inhibitor (A) is from 400 to 800 ppm relative to the polyamide layer.

Note that "ppm" in the present invention indicates parts per million by mass.

From the perspective of effectively suppressing yellowing of the recycled polyester and suppressing blueness of the multilayer container, the content of the yellowing inhibitor (A) is from 400 to 800 ppm and preferably 500 to 700 ppm, in relation to the polyamide layer.

In relation to the total amount of all polyamide layers and all polyester layers, the content of the yellowing inhibitor (A) is preferably from 1 to 20 ppm, more preferably from 7 to 19 ppm, even more preferably from 10 to 18 ppm, and yet even more preferably from 13 to 17 ppm.

The yellowing inhibitor (A) is a dye, and is preferably a blue dye.

A recycled polyester having excellent transparency can be obtained using a dye.

Examples of dyes used as the yellowing inhibitor (A) include anthraquinone-based dyes, pyrazolone-based dyes, coumarin-based dyes, perinone-based dyes, methine-based dyes, and quinophthalone-based dyes, and anthraquinone-based dyes are preferable.

Examples of the anthraquinone-based dyes include anthraquinone-based dyes in which a hydrogen atom of the aromatic ring is substituted with an aromatic amine, an aliphatic amine, a hydroxyl group, or a halogen, and an anthraquinone-based dye in which a hydrogen atom of the aromatic ring is substituted with an aromatic amine is preferable.

Yellowing of the recycled polyester obtained from the multilayer container of the present invention can be suppressed by using an extremely small amount of an anthraquinone-based dye.

The anthraquinone-based dye is more preferably an anthraquinone-based blue dye.

The anthraquinone-based dye is preferably a compound represented by Formula (1) below.

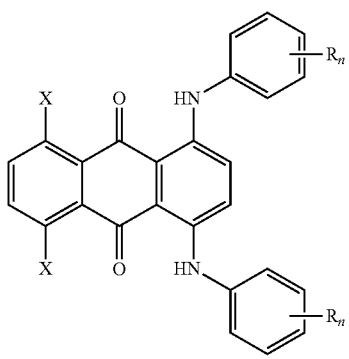

(1)

(Where n represents the number of R, and the two n are each independently from 1 to 5. Each R independently represents a $C_{1-4}$ alkyl group. The two X each independently represent a hydrogen atom or a hydroxyl group.)

In Formula (1), n is from 1 to 5, preferably from 2 to 5, and more preferably from 2 to 3. Yellowing ($\Delta b^*$ value) of the recycled polyester can be suppressed by setting n to the range described above. Each R is independently a $C_{1-4}$ alkyl group, and is preferably at least one selected from the group consisting of a methyl group and an ethyl group. R is preferably substituted at least at the para position or ortho position relative to the amino group, is more preferably substituted at least at the ortho position, and is even more preferably substituted at the ortho position and the para position. The two X are each independently a hydrogen atom or a hydroxyl group, and a hydrogen atom is preferable.

Specific examples of the compounds represented by Formula (1) include 1,4-bis[(2-ethyl-6-methylphenyl)amino]anthraquinone, Solvent Blue 97, Solvent Blue 104, Solvent Green 3, and Solvent Green 28, and 1,4-bis[(2-ethyl-6-methylphenyl)amino]anthraquinone, Solvent Blue 97, and Solvent Blue 104 are preferable.

From the perspective of effectively suppressing yellowing of the recycled polyester and suppressing blueness of the multilayer container, when the yellow-yellowing inhibitor (A) is an anthraquinone-based dye, the content of the anthraquinone-based dye, which is the yellowing inhibitor (A), is from 400 to 800 ppm, and preferably from 500 to 700 ppm in relation to the polyamide layer.

When the yellowing inhibitor (A) is an anthraquinone-based dye, the content of the anthraquinone-based dye, which is the yellowing inhibitor (A), is preferably from 1 to 20 ppm, more preferably from 7 to 19 ppm, even more preferably from 10 to 18 ppm, and still even more preferably from 13 to 17 ppm, relative to the total amount of all polyester layers and all polyester layers.

One type of the yellowing inhibitor (A) may be used alone, or two or more types may be used in combination.

Examples of commercially available products of the yellowing inhibitor (A) include MACROLEX Blue RR Gran (anthraquinone-based dye, available from Lanxess AG), MACROLEX Blue 3R (1,4-bis[(2-ethyl-6-methylphenyl)amino]anthraquinone, anthraquinone-based dye, available from Lanxess AG), and Oracet Blue 690 (anthraquinone-based dye, available from BASF SE).

Greening Inhibitor (B)

The polyamide layer of the multilayer container preferably includes a greening inhibitor (B).

The greening inhibitor (B) suppresses green color in a-a* direction as measured with a color difference meter when the multilayer container of the present invention is recycled to obtain a recycled polyester.

Relative to the total amount of all polyamide layers and all polyester layers, the content of the greening inhibitor (B) is from 1 to 30 ppm, and from the perspective of effectively suppressing greening of the recycled polyester, the content thereof is preferably from 1.5 to 25 ppm, and from the perspective of mixability and moldability during manufacturing, the content thereof is more preferably from 2 to 22 ppm, and even more preferably from 3 to 20 ppm.

Note that "ppm" in the present invention indicates parts per million by mass.

From the perspective of effectively suppressing greening of the recycled polyester, the content of the greening inhibitor (B) in the polyamide layer is preferably from 0.001 to 1.0 mass %, more preferably from 0.005 to 0.5 mass %, even more preferably from 0.008 to 0.1 mass %, and yet even more preferably from 0.01 to 0.08 mass %.

A mass ratio [(A)/(B)] of the yellowing inhibitor (A) and the greening inhibitor (B) in the polyamide layer of the multilayer container of the present invention is preferably from 20/80 to 80/20, more preferably from 30/70 to 70/30, and even more preferably from 40/60 to 60/40.

When the mass ratio is within this range, the hue change of the recycled polyester obtained after recycling is small, and in particular, a polyester having excellent achromaticity is obtained.

The greening inhibitor (B) is preferably at least one selected from the group consisting of dyes and pigments, and is more preferably a dye from the perspective of transparency.

Among the dyes, the dye used as the greening inhibitor (B) is preferably at least one selected from the group consisting of anthraquinone-based dyes and azo-based dyes, and from the perspective of thermal resistance, an anthraquinone-based dye is more preferable.

Furthermore, the greening inhibitor (B) is preferably a red dye, is more preferably at least one selected from the group consisting of anthraquinone-based red dyes and azo-based red dyes, and from the perspective of thermal resistance, is even more preferably an anthraquinone-based red dye.

Greening of recycled polyester obtained from the multilayer container of the present invention can be suppressed by using an extremely small amount of an anthraquinone-based red dye and an azo-based red dye.

The anthraquinone-based dye is preferably a compound represented by Formula (2) below.

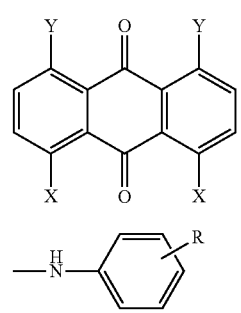

(2)

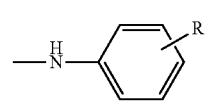

(2a)

(In Formula (2), the two Y are each independently a hydrogen atom or a group represented by Formula (2a), and the two X are each independently a hydrogen atom or a hydroxyl group. However, at least one Y is a group represented by Formula (2a).

Furthermore, in Formula (2a), R represents a $C_{1-4}$ alkyl group.)

In Formula (2), each of the two Y independently represents a hydrogen atom or a group represented by Formula (2a), but preferably at least one Y is a group represented by Formula (2a). Preferably, one Y is a group represented by Formula (2a), and the other Y is a hydrogen atom.

The two X each independently represent a hydrogen atom or a hydroxyl group, but when one Y is a group represented by Formula (2a), the X bonding to the same aromatic ring is preferably a hydroxyl group.

In Formula (2a), R represents a $C_{1-4}$ alkyl group and is preferably at least one selected from the group consisting of a methyl group and an ethyl group. Note that when the two Y are both groups represented by Formula (2a), the two R in the groups represented by Formula (2a) may be the same or different. R is preferably substituted at the para position with respect to the amino group.

Specific examples of the compound represented by Formula (2) include Solvent Violet 36 and Solvent Violet 13, and Solvent Violet 36 is preferable.

When the greening inhibitor (B) is an anthraquinone-based dye, from the perspective of effectively suppressing greening of the recycled polyester, the content of the anthraquinone-based dye, which is the greening inhibitor (B), in the polyamide layer is preferably from 0.001 to 1.0 mass %, more preferably from 0.005 to 0.5 mass %, even more preferably from 0.008 to 0.1 mass %, and yet even more preferably from 0.01 to 0.08 mass %.

One type of the greening inhibitor (B) may be used alone, or two or more types may be used in combination.

Examples of commercially available products of the greening inhibitor (B) include MACROLEX Violet 3R Gran (anthraquinone-based dye, available from Lanxess AG), MACROLEX Violet B Gran (anthraquinone-based dye, available from Lanxess AG), MACROLEX Red Violet R Gran (Disperse Violet 31, Disperse Violet 26, Solvent Violet 59, anthraquinone-based dye, available from Lanxess AG), MACROLEX Red 5B Gran (Disperse Violet 31, Disperse Violet 26, Solvent Violet 59, anthraquinone-based dye, available from Lanxess AG), and MACROLEX Red B (Solvent Red 195, azo-based dye, available from Lanxess AG).

Other Components

The polyamide layer may contain other components. Examples of the other components include thermal stabilizers, photostabilizers, moisture-proof agents, waterproofing agents, lubricants, and spreading agents.

The polyamide layer may contain, within a range that does not impair the effects of the present invention, a resin other than the polyamide resin (Y) that is the main component.

In particular, when the yellowing inhibitor (A) is mixed using the masterbatch method described below, it is preferable to contain the polyamide resin or polyester resin used in the masterbatch. In this case, the content of the polyamide resin or polyester resin used in the masterbatch is preferably from 1 to 20 mass % and more preferably from 3 to 15 mass % relative to the amount of resin in the entire polyamide layer. The content of the polyamide resin (Y) is preferably from 80 to 100 mass %, and more preferably from 90 to 100 mass % relative to the amount of resin in the entire polyamide layer.

In the polyamide layer of the multilayer container of the present invention, the total content of the polyamide resin (Y), the yellowing inhibitor (A), and the greening inhibitor (B) is preferably from 80 to 100 mass %, and more preferably from 90 to 100 mass %, relative to the entire polyamide layer. The polyamide layer may contain only the polyamide resin (Y), the yellowing inhibitor (A), and the greening inhibitor (B). Also, when a polyester resin is used in a masterbatch, the total content of the polyamide resin (Y), the polyester resin used in the masterbatch, the yellowing inhibitor (A), and the greening inhibitor (B) in the polyamide layer of the multilayer container of the present invention is preferably from 80 to 100 mass %, and more preferably from 90 to 100 mass %, relative to the entire polyamide layer. The polyamide layer may contain only the polyamide resin (Y), the polyester resin used in the masterbatch, the yellowing inhibitor (A), and the greening inhibitor (B).

<Multilayer Container Structure and Characteristics>

The multilayer container of the present invention has a multilayer structure including a polyester layer containing the polyester resin (X) and a polyamide layer containing the polyamide resin (Y) and the yellowing inhibitor (A), and an L* value of the multilayer container is 87.5 or greater.

A resin layer other than the polyester layer and the polyamide layer may be included in the multilayer container of the present invention, but from the perspectives of facilitating separation during recycling and improving colorlessness, the content of the resin layer other than the polyester layer and the polyamide layer is preferably low, and more preferably, the multilayer container of the present invention is substantially free of a resin layer other than the polyester layer and the polyamide layer. Additionally, an adhesive layer made from an adhesive or an inorganic layer made from an inorganic material may be provided, but from the perspectives of facilitating separation during recycling and improving the yellowing suppression effect, the content of the adhesive layer or the inorganic layer is preferably low, and more preferably, the multilayer container of the present invention is substantially free of an adhesive layer or an inorganic layer.

The multilayer container of the present invention preferably has a multilayer structure of two or more layers, preferably has a structure of from two to five layers, more preferably has a structure of from three to five layers, even more preferably has a three layer structure or a five layer structure, and yet even more preferably has a three layer structure.

The outermost layer of the multilayer container of the present invention is preferably a polyester layer. Furthermore, the innermost layer is also preferably a polyester layer, and more preferably the outermost layer and the innermost layer are both polyester layers.

When the outermost layer is a polyester layer, the multilayer container excels in impact resistance, appearance and design properties.

Therefore, as the structure of the multilayer container, the multilayer container preferably has a structure of from two to five layers with the outermost layer being a polyester layer, and more preferably has a structure of from three to five layers with the outermost layer and the innermost layer being polyester layers.

In the case of a two-layer structure, the structure is preferably, in order from the innermost layer, a polyamide layer/polyester layer, in the case of a three-layer structure, the structure is preferably, in order from the innermost layer, a polyester layer/polyamide layer/polyester layer, and in the case of a five-layer structure, the structure is preferably, in order from the innermost layer, a polyester layer/polyamide layer/polyester layer/polyamide layer/polyester layer.

The multilayer container of the present invention has an L* value of 87.5 or higher, preferably 89.0 or higher, more preferably 89.5 or higher, and even more preferably 90.0 or higher. The L* value is also not higher than 100.0.

The L* value represents brightness, and when the L* value is high, whiteness is high, and when the L* value is low, blackness is high.

Blueness can be efficiently reduced by setting the L* value of the multilayer container to within the abovementioned range.

The reason why blueness can be reduced and a multilayer container excelling in colorlessness can be obtained by setting the L* value of the multilayer container to within the abovementioned range is not clear. However, it is assumed that setting the L* value to such a range results in a reduction in light that is absorbed or scattered on the surface or inside the multilayer container and a reduction in the impact of the yellowing inhibitor on the light transmitted through or reflected by the multilayer container.

Examples of methods for adjusting the L* value of the multilayer container to the range described above include a method of reducing the content of pigment contained in the polyester layer and the poly amide layer, preferably a method of substantially not containing a pigment in the polyester layer and the polyamide layer, a method of adjusting the molding conditions of the container, and a method of substantially not containing a reheating agent in the polyester layer.

The L* value of the multilayer container can be determined by measuring in accordance with JIS K 7105. Specifically, the L* value can be measured by the method described in the examples.

The multilayer container of the present invention is preferably a hollow container, and when the multilayer container is a hollow container, the trunk section thereof has at least a multilayer structure. A ratio (thickness ratio W/S) of a thickness (W) of the polyester layer to a thickness (S) of the polyamide layer of the trunk section is preferably from 2.5 to 200. Note that the thickness of the polyester layer refers to the average thickness, and when a plurality of polyester layers are present in the trunk section, the thicknesses of the plurality of layers are averaged, and the average thickness per layer is determined. The same applies to the thickness of the polyamide layer.

The thickness ratio W/S is preferably 2.5 or greater because at such ratio, the polyamide resin is easily separated from the polyester resin in a separation step of a method for manufacturing recycled polyester, and particularly in air elutriation or specific gravity separation. When the thickness ratio W/S is 200 or less, the gas barrier properties of the hollow container are excellent, and the contents can be stored for a long period of time.

From the perspective of improving the gas barrier properties of the hollow container while increasing the separation case in the separation step, the thickness ratio (W/S) is more preferably from 3 to 50, and even more preferably from 4 to 15.

Additionally, when the multilayer container is a hollow container, the total thickness of the trunk section of the hollow container (that is, the total thickness of all layers of the trunk section) is preferably from 100 μm to 5 mm, more preferably from 150 μm to 3 mm, and even more preferably from 200 μm to 2 mm. Additionally, the thickness (W) of each polyester layer is preferably from 30 μm to 2 mm, more preferably from 40 μm to 1 mm, and even more preferably from 50 μm to 500 μm. The thickness (S) of each polyamide layer is preferably from 1 to 200 μm, more preferably from 3 to 100 μm, and even more preferably from 8 to 50 μm. In the present invention, when the thickness of the polyamide layer is within this range, the polyamide layer is easily separated from the polyester in a separation step while ensuring gas barrier properties.

When the multilayer container of the present invention is a hollow container, the multilayer container is preferably a liquid packaging container used by filling the inside of the hollow container with a liquid, and is even more preferably a beverage packaging container.

Examples of the liquid to be filled inside include beverages, liquid seasonings, chemicals, pharmaceuticals, and detergents, and beverages for which deterioration due to oxygen can be effectively prevented by the multilayer container of the present invention are preferable.

Examples of the beverages include water, carbonated water, oxygenated water, hydrogen water, milk, milk products, juices, coffee, coffee beverages, carbonated soft drinks, teas, and alcoholic beverages.

Examples of the liquid seasonings include sauces, soy sauce, syrups, rice wine seasonings, and dressings.

Examples of chemicals include agricultural chemicals and pesticides.

The oxygen barrier property of the multilayer container of the present invention can be evaluated through an oxygen permeability test by the MOCON method in accordance with ASTM D3985. The oxygen permeability (cc/(bottles·0.21 atm·day)) of the multilayer container of the present invention is preferably 0.040 or less, more preferably 0.035 or less, and even more preferably 0.030 or less when a total amount of 25 g of resin is formed into a three-layer hollow container having an internal volume of 500 mL with a mass ratio of the polyester layer to the polyamide layer being 97:3. Note that the three-layer hollow container can be manufactured according to the method described in the examples.

For the measurements, the OX-TRAN 2/61 available from MOCON, Inc. is used. The 500 mL container is filled with 100 ml of water, nitrogen at 1 atm is circulated inside the container at a rate of 20 mL/min under conditions including an oxygen partial pressure of 0.21 atm, a temperature of 23° C., a container internal humidity of 100% RH, and an external humidity of 50% RH, and oxygen contained in the nitrogen after circulating inside the container is detected by a coulometric sensor, and thereby the oxygen permeability is measured.

[Method for Manufacturing Multilayer Container]

A method for manufacturing a multilayer container according to the present invention includes the following three steps with the multilayer container having a polyester layer including a polyester resin (X), and a polyamide layer including a polyamide resin (Y) and a yellowing inhibitor (A). The content of the polyamide resin (Y) is from 0.05 to 7.0 mass % relative to a total amount of all polyamide layers and all polyester layers. The yellowing inhibitor (A) is a dye. The content of the yellowing inhibitor (A) is from 400 to 800 ppm relative to the polyamide layer, and the L* value of the multilayer container is 87.5 or greater.

Step 1: mixing the polyamide resin (Y) and the yellowing inhibitor (A) to prepare a polyamide resin mixture;

Step 2: co-injection molding the polyamide resin mixture and a polyester resin composition containing the polyester resin (X), and thereby obtaining a multilayer preform, and Step 3: blow molding the multilayer preform.

<Step 1 (Step of Preparing Polyamide Resin Mixture)>

In step 1, the polyamide resin (Y) and the yellowing inhibitor (A) are mixed to prepare a polyamide resin mixture.

Ordinarily, in order to ensure that the yellowing inhibitor spreads throughout the entire container, equipment is required to stir and mix or knead the yellowing inhibitor and all of the resins. However, in the manufacturing method of the multilayer container of the present invention, the yellowing inhibitor (A) is mixed into a small amount of the polyamide resin (Y), and thereby the yellowing inhibitor (A) can be efficiently spread throughout the entire container by mixing on a small scale for a short period of time, and thus the manufacturing method of the present invention excels in productivity.

The method of mixing may be dry blending or melt blending (melt kneading), but from the perspectives of reducing the heat history and preventing degradation of the resin or yellowing inhibitor, dry blending and melt blending with the masterbatch method are preferable. Further, from the perspective of preventing the yellowing inhibitor from adhering to and remaining on a molding machine or around the molding machine in step 2, melt blending is preferable, and of the melt blending techniques, the masterbatch method is preferable from the perspective of reducing the heat history and preventing degradation of the resin and yellowing inhibitor.

In step 1, the pellet-shaped polyamide resin (Y) and the yellowing inhibitor (A) are preferably mixed at a temperature of 230° C. or lower, are more preferably mixed at a temperature of 150° C. or lower, and are even more preferably mixed at a temperature of 100° C. or lower. When mixing is implemented at a temperature of 230° C. or lower, the heat history can be reduced, and degradation of the resin or yellowing inhibitor can be prevented. It is conceivable that this is achieved because the polyamide resin can maintain the pellet shape, and therefore thermal degradation is minimal. Dry blending is preferably implemented when mixing at a temperature of 230° C. or lower.

The yellowing inhibitor (A) suitably used in step 1 is the same as the yellowing inhibitor (A) described in the Yellowing Inhibitor (A) section, is a dye, and is more preferably an anthraquinone-based dye.

From the perspective of effectively suppressing yellowing of the recycled polyester and suppressing blueness of the multilayer container, the blending amount of the yellowing inhibitor (A) is from 400 to 800 ppm and preferably from 500 to 700 ppm, in relation to the polyamide resin mixture that becomes the polyamide layer of the obtained multilayer container.

In relation to the total amount of all polyamide layers and all polyester layers, the blending amount of the yellowing inhibitor (A) is preferably from 1 to 20 ppm, more preferably from 7 to 19 ppm, even more preferably from 10 to 18 ppm, and yet even more preferably from 13 to 17 ppm.

Furthermore, the yellowing inhibitor (A) is preferably in the form of a powder, a dispersion, or a solution, and is more preferably in the form of a powder. The yellowing inhibitor (A) in these forms can be more easily and uniformly mixed with the polyamide resin (Y).

By mixing the pellet-shaped polyamide resin (Y) and the powdered yellowing inhibitor (A) at a low temperature in this manner, the yellowing inhibitor can be uniformly mixed with the resin while preventing degradation of the resin or yellowing inhibitor.

In addition, the greening inhibitor (B) is preferably further mixed in step 1.

The greening inhibitor (B) suitably used in step 1 is the same as the greening inhibitor described in the above Greening inhibitor (B) section, and is preferably at least one selected from the group consisting of dyes and pigments, is more preferably at least one selected from the group consisting of anthraquinone-based dyes and azo-based dyes, is even more preferably at least one selected from the group consisting of anthraquinone-based red dyes and azo-based red dyes, and from the perspective of thermal resistance, is yet even more preferably an anthraquinone-based red dye.

From the perspective of effectively suppressing greening of the recycled polyester, the blending amount of the greening inhibitor (B) in the polyamide resin mixture that becomes the polyamide layer of the obtained multilayer container is preferably from 0.001 to 1.0 mass %, more preferably from 0.005 to 0.5 mass %, even more preferably from 0.008 to 0.1 mass %, and yet even more preferably from 0.01 to 0.08 mass %.

Furthermore, the greening inhibitor (B) is preferably in the form of a powder, a dispersion, or a solution, and is more preferably in the form of a powder. The greening inhibitor (B) in these forms can be more easily and uniformly mixed with the polyamide resin (Y).

A mass ratio [(A)/(B)] of the yellowing inhibitor (A) to the greening inhibitor (B) in the polyamide resin mixture that becomes the polyamide layer of the obtained multilayer container is preferably from 20/80 to 80/20, more preferably from 30/70 to 70/30, and even more preferably from 40/60 to 60/40.

Examples of the mixing device used in the dry blending include a tumbler mixer, a ribbon mixer, a Henschel mixer, and a Banbury mixer.

Examples of the method for mixing the polyamide resin (Y) and the yellowing inhibitor (A) by melt blending in step 1 include the masterbatch method and a full compounding method, and the masterbatch method is preferable.

The masterbatch method is a method of kneading a small amount of polyamide resin or polyester resin and a yellowing inhibitor (A) to form a masterbatch, and then mixing with the remaining polyamide resin (Y) in step 1. Further, when obtaining a masterbatch, the greening inhibitor (B) can also be kneaded at the same time. In other words, preferably, in step 1, the polyamide resin or the poly ester resin and the yellowing inhibitor (A) are kneaded and then mixed with the polyamide resin (Y), and more preferably, in step 1, the polyamide resin of polyester resin, the yellowing inhibitor (A), and the greening inhibitor (B) are kneaded and then mixed with the polyamide resin (Y).

A polyamide resin or a polyester resin is preferably used in the masterbatch, and from the perspective of miscibility with the polyamide resin (Y), a polyamide resin is preferably used, and from the perspective of suppressing yellowing due to heat history, a polyester resin is preferably used. Note that these materials may be mixed and used.

The polyamide resin used in the masterbatch is preferably a polyamide resin (Y), and is more preferably the same as the remaining polyamide resin (Y).

The polyester resin used in the masterbatch is preferably a polyester resin (X), and is more preferably the same as the polyester resin (X) of the polyester layer.

The amount of the polyamide resin or the polyester resin used in the masterbatch is preferably from 1 to 20 mass %, and more preferably from 3 to 15 mass % relative to the resin amount of the entire polyamide layer.

When a polyamide resin or a polyester resin and the yellowing inhibitor (A) are kneaded as the method for obtaining a masterbatch, if the melting point of the resin used in the masterbatch is denoted by Tm, from the perspective of sufficient mixing, the kneading temperature (° C.) is preferably from Tm+5 to Tm+60, more preferably from Tm+10 to Tm+50, and even more preferably from Tm+15 to Tm+40. Specifically, the kneading temperature is even more preferably from 245 to 300° C., yet even more preferably from 250 to 290° C., and still even more preferably from 255 to 280° C. In addition, from the perspective of sufficiently kneading, the kneading time is preferably from 10 to 600 seconds, more preferably from 20 to 400 seconds, and even more preferably from 30 to 300 seconds. Examples of the device used for kneading include an open type mixing roll, a non-open type Banbury mixer, a kneader, and a continuous kneader (such as a single-screw kneader, a twin-screw kneader, and a multi-screw kneader).

Furthermore, examples of methods for mixing the masterbatch and the remaining poly amide resin (Y) include dry blending and a kneading method, and dry blending is preferable. For the dry blending, preferably pellets of the masterbatch are mixed with pellets of the remaining polyamide resin (Y) using a mixing device such as a tumbler mixer.

The full compounding method is a method of kneading and mixing the total amount of the poly amide resin (Y) and the yellowing inhibitor (A) used in the polyamide layer.

From the perspective of sufficient mixing, the kneading temperature is preferably from 245 to 300° C., more preferably from 250 to 290° C., and even more preferably from 255 to 280° C. In addition, from the perspective of sufficiently kneading, the kneading time is preferably from 10 to 600 seconds, more preferably from 20 to 400 seconds, and even more preferably from 30 to 300 seconds. Examples of the device used for kneading include an open type mixing roll, a non-open type Banbury mixer, a kneader, and a continuous kneader (such as a single-screw kneader, a twin-screw kneader, and a multi-screw kneader).

The polyamide resin mixture obtained in this step is preferably a composition similar to that described in the <Poly amide layer> section above.

<Step 2 (Step of Obtaining Multilayer Preform)>

In step 2, the polyamide resin mixture and a polyester resin composition containing a polyester resin (X) are co-injection molded to obtain a multilayer preform.

The polyester resin composition is preferably a composition similar to that described in the <Polyester layer> section above, other than the polyester resin (X).

Also, in the co-injection molding, the polyester resin and the polyamide resin mixture are extruded in molds, respectively, and then co-injection molded to form a multilayer preform.

<Step 3 (Blow Molding Step)>

In step 3, the multilayer preform is blow molded.

In the method of manufacturing a multilayer container of the present invention, the multilayer preform (multilayer parison) obtained in step 2 is preferably molded by stretch blowing.

Of these, in step 2, the multilayer preform obtained by co-injection molding is preferably stretch-blow molded, and more preferably, the multilayer preform obtained by co-injection molding is biaxially stretch-blow molded. The conditions for biaxial stretch-blow molding preferably include a preform heating temperature of from 95 to 110° C., a primary blow pressure of from 0.5 to 1.2 MPa, and a secondary blow pressure of from 2.0 to 2.6 MPa. The occurrence of uneven thickness and uneven stretching is suppressed through biaxial stretch-blow molding under these conditions, and therefore a multilayer container having excellent strength can be obtained.

[Method for Manufacturing Recycled Polyester]

The multilayer container of the present invention is suitable for recycling as described above, and recycled polyester can be manufactured using the multilayer container of the present invention as a raw material.

The recycled polyester manufacturing method of the present invention preferably includes recovering polyester from the multilayer container.

That is, the recycled polyester manufacturing method of the present invention preferably includes recovering polyester from a multilayer container having a polyester layer including a polyester resin (X), and a polyamide layer including a polyamide resin (Y) and a yellowing inhibitor (A) with the content of the polyamide resin (Y) being from 0.05 to 7.0 mass % relative to a total amount of all polyamide layers and all polyester layers, the yellowing inhibitor (A) being a dye, the content of the yellowing inhibitor (A) being from 400 to 800 ppm relative to the polyamide layer, and an L* value of the multilayer container being 87.5 or greater.

The method for manufacturing recycled polyester from the multilayer container preferably includes removing all or a portion of the polyamide layer from the multilayer container, recovering the polyester constituting the polyester layer, and using the recovered polyester as recycled polyester. Note that the method for manufacturing recycled polyester from the multilayer container is not limited to the above-described method, and may be a method of manufacturing recycled polyester without passing through the step of removing the polyamide resin.

The recycled polyester obtained by the present manufacturing method can be used in various applications such as resin molded articles and fibers.

Details of the recycled polyester manufacturing method of the present invention will be described below.

In the present manufacturing method, a used multilayer container is ordinarily used as the multilayer container, but an unused multilayer container may also be used. Examples of the used multilayer container include those that have been distributed in the market and then collected.

In the present manufacturing method, first, if a lid is attached to the multilayer container, the lid is preferably removed from the multilayer container.

Next, the container is ground, washed as needed, and then subjected to separation to selectively remove the polyester as needed, and thereby the polyester is recovered as recycled polyester (recovery step).

Next, if necessary, the polyester is granulated to obtain pellets (granulation step).

Further, if necessary, a crystallization step and a solid phase polymerization step are implemented (crystallization/solid phase polymerization step).

Each step is described below.

<Recovery Step>

The recovery step is a step of grinding the multilayer container to recover recycled polyester.

In this step, after the multilayer container is ground, preferably, all or a portion of the poly amide layer is removed, and the polyester is selectively retrieved, and more preferably, the polyester and the polyamide resin constituting the polyamide layer are separated.

The multilayer container can be ground using a grinder such as a single-screw grinder, a twin-screw grinder, a three-screw grinder, or a cutter mill. The ground product obtained by grinding is formed into, for example, a flake shape, a powdered shape, or a bulk shape. However, a large portion of the multilayer container has a thin multilayer laminated structure with a thickness of several mm or less, such as the trunk section, and therefore most of the ground product is ordinarily flake-shaped. Note that the flake-shaped ground product refers to a flaky or flat shaped product having a thickness of approximately 2 mm or less.

Additionally, in the multilayer container, the polyester layer and the polyamide layer are structurally integrated, but these layers are usually not adhered to each other, and in the grinding step, the polyester and the polyamide resin are easily separated as separate ground products. In addition, by forming the ground product in flake shapes, the ground product is more likely to be blown up and separated by the air flow of the air elutriation described below.

However, the polyester and the polyamide resin are not necessarily materials that can be completely separated in the grinding step, and the ground product is separated into a ground product having a relatively high content percentage of polyester and a ground product having a relatively low content percentage of polyester resin and a relatively high content percentage of polyamide. Note that in the following, for convenience of explanation, the ground product having a relatively high content percentage of polyester is referred to simply as polyester, and the ground product having a relatively high content percentage of polyamide resin is referred to simply as polyamide resin.

As described above, the ground product that has been ground is separated into polyester and polyamide resins (separation step).

As the separation method, specific gravity sorting using the difference in the specific gravities of the polyester and the polyamide resins is preferably used.

In other words, the polyamide layer is preferably removed by air elutriation after the multilayer container has been ground.

A specific example of specific gravity sorting is air elutriation in which the ground product is sorted through wind force. An example of air elutriation includes a method in which the ground product is subjected to an airflow generated by a separation device that can internally generate a rotating airflow, and the ground product is separated into: a ground product that has a large specific gravity or a small specific surface area and naturally descends due to the weight of the ground product itself, and a ground product that has a small specific gravity or a large specific surface area and is blown upward by the airflow, and the separated ground products are recovered.

With this method, the ground product of polyester naturally descends under its own weight, whereas the ground product of the polyamide resin is blown upward, and through this, the polyester and polyamide resin can be separated and recovered.

In this type of air elutriation, a similar operation may be repeated for the same ground product. For example, the naturally descended ground product may be once again subjected to air elutriation to increase the content percentage of polyester in the recycled polyester.

Note that the separation method is not limited to air elutriation, and other examples include a method of immersing the ground product in a liquid such as water and separating by differences in specific gravity of the ground product with respect to the liquid, and a method of applying a constant level of vibration to the ground product and separating ground products of different specific gravities.

<Granulation Step>

The recycled polyester that is recovered is preferably granulated and formed into pellets in order to simplify handling during molding and the like.

The granulation may be implemented before or after the below-described crystallization/solid phase polymerization step, but it is preferable to implement granulation before the crystallization/solid phase polymerization step. When granulation is implemented before the crystallization/solid phase polymerization step, handling ease in the crystallization/solid phase polymerization step is favorable.

In the granulation step, it is preferable to plasticize and granulate the ground product through melt blending. Examples of the granulation device for plasticization and granulation include a single-screw extruder, a twin-screw extruder, and a multi-screw extruder, but any known granulation device can be used. The shape of the pellets is preferably cylindrical, spherical, or elliptical.

The granulation preferably includes, for example, extruding the plasticized recycled polyester into a strand, and cutting into pellets using a pelletizer while cooling in a water tank. Pellets removed from the water tank are usually dried to remove moisture adhered to the surface.

<Crystallization/solid Phase Polymerization Step>

After the above-described step of recovering the polyester, it is preferable to implement one or more steps selected from a crystallization step and a solid phase polymerization step, and it is more preferable to implement both the crystallization step and the solid phase polymerization step. The crystallization/solid phase polymerization step is preferably implemented on the pelletized polyester described above, but may be implemented on a non-pelletized polyester (for example, the ground product).

Note that when crystallization and solid phase polymerization are both implemented, the polyester is preferably crystallized and then subjected to solid phase polymerization.

Crystallization of the polyester is implemented by maintaining the polyester under constant heating. The crystallization is preferably implemented by heating the polyester at a temperature of from 100 to 230° C., for example. The polyester is crystallized, and thereby mutual fusing of the polyester and adhering of the polyester to the inner surface of the device during solid phase polymerization and molding are prevented.

The solid phase polymerization is preferably implemented by maintaining at a temperature of from the (polyester melting point −80° C.) to less than the melting point of the polyester for a certain duration of time. By implementing the solid phase polymerization at a temperature lower than the melting point, melting of the polyester is prevented, and for example, adhering of the polyester to the device surface, which results in a decrease in work efficiency, is prevented. Also, by implementing the solid phase polymerization at a temperature of equal to or higher than the (melting point −80° C.), the polymerization proceeds at a sufficient polymerization rate, and the desired physical properties are easily obtained.

Solid phase polymerization may be carried out under vacuum conditions, and may be carried out under an inert gas stream such as nitrogen or argon. If solid phase polymerization is carried out under vacuum conditions, the vacuum pressure is preferably 1.0 torr or less, more preferably 0.5 torr or less, and even more preferably 0.1 torr or less. Furthermore, under both vacuum conditions and an inert gas stream such as nitrogen or argon, the oxygen concentration remaining in the system is preferably reduced as much as possible, and the oxygen concentration is preferably 300 ppm or less, and more preferably 30 ppm or less. When the oxygen concentration is set to 30 ppm or less, appearance defects such as yellowing are less likely to occur.

Furthermore, when the solid phase polymerization is implemented under vacuum conditions, it is preferable to uniformly maintain heat transfer while constantly repeating the stirring or mixing of the polyester. When the solid phase polymerization is implemented in the presence of an inert gas, it is preferable to keep the surface of the polyester in contact with a dry gas at all times under a stream of the dry gas.

Examples of the solid-phase polymerization device for carrying out the crystallization/solid phase polymerization step include a tumbler-type batch device equipped with a heating jacket, a dry silo-type device provided with inert gas stream equipment, a crystallization device provided internally with a stirrer blade and a discharging screw, and a reactor. Note that the crystallization and solid phase polymerization are preferably implemented consecutively or simultaneously in the same device.

The heating time for the solid phase polymerization is determined in a timely manner based on the device and other conditions, but the time may be any time as long as the polyester obtains sufficient physical properties.

The solid phase polymerization maintains the polyester at a high temperature for a long period of time, and therefore impurities present in the polyester may deteriorate the quality such as the color tone. In the removal step described above, a large portion of the polyamide resin is preferably removed, and in this case, the deterioration of quality that may occur during solid phase polymerization is minimized.

In the recycled polyester manufacturing method of the present invention, steps in addition to the steps described above may be implemented, and a washing step may be implemented to remove contents adhering to the interior of the multilayer container. The washing is preferably implemented by rinsing with a liquid, and may be washing with water, washing with an alkaline aqueous solution, or both.

Furthermore, the washing may be implemented before the multilayer container is ground into a ground product, or may be implemented after grinding, but the washing is preferably implemented before any of granulation, crystallization, and solid phase polymerization are implemented. Furthermore, the washing step may be implemented simultaneously with the grinding step using a grinder called a wet grinder that simultaneously carries out washing and grinding.

In addition, when the washing step is implemented, a drying step may be implemented after the washing step. By implementing the drying step, the amount of moisture in the recycled polyester obtained by the present method can be reduced, and therefore high quality recycled polyester can be provided with high thermal stability and the like. The drying step can be implemented, for example, through air blowing or hot air using a dryer.

When the method for manufacturing the recycled polyester includes a step of removing the polyamide resin, the content of the polyamide resin in the obtained recycled polyester is preferably less than 1 mass %, more preferably less than 0.8 mass %, and even more preferably less than 0.6 mass %. By reducing the content of the polyamide resin in this manner, the quality of the recycled polyester becomes favorable.

EXAMPLES

The present invention will be described more specifically hereinafter using examples and comparative examples, but the present invention is not limited to these examples.

[Raw Materials]

The polyester resins, yellowing inhibitors and greening inhibitors used in the examples and comparative examples were as follows. Furthermore, a polyamide resin manufactured in the following Manufacturing Example 1 was used as the polyamide resin.

<Polyester Resin>

8912: Isophthalic acid copolymerized polyethylene terephthalate (intrinsic viscosity: 0.85 dL/g), trade name: TYPE 8912, available from Indorama Ventures Public Company Limited, not containing a reheating agent BK2180: Isophthalic acid copolymerized polyethylene terephthalate (intrinsic viscosity: 0.83 dL/g, melting point: 248° C.), trade name: BK2180, available from Mitsubishi Chemical Corporation, not containing a reheating agent 1101: Isophthalic acid copolymerized polyethylene terephthalate (intrinsic viscosity: 0.83 dL/g), trade name: TYPE 1101, available from Indorama Ventures Public Company Limited, containing a reheating agent <Yellowing Inhibitor>

Blue RR: Solvent Blue 97 (anthraquinone-based dye), trade name: MACROLEX Blue RR Gran, available from Lanxess AG Blue 690: Solvent Blue 104 (anthraquinone-based dye), trade name: Oracet Blue 690, available from BASF SE <Greening Inhibitor>

Violet 3R: Solvent Violet 36 (anthraquinone-based dye), trade name: MACROLEX Violet 3R Gran, available from Lanxess AG <Polyamide Resin>

Manufacturing Example 1 (Manufacturing of Polyamide Resin (Y1))

A reaction container having an internal volume of 50 liters and equipped with a stirrer, a partial condenser, a total condenser, a thermometer, a dropping funnel, a nitrogen introduction tube, and a strand die was filled with precisely weighed materials including 15000 g (102.6 mol) of adipic acid, 13.06 g (123.3 mmol, 151 ppm as a phosphorus atom concentration in the polyamide) of sodium hypophosphite monohydrate ($NaH_2PO_2 \cdot H_2O$), and 6.849 g (83.49 mmol, 0.68 as a ratio of the number of moles with respect to the sodium hypophosphite monohydrate) of sodium acetate, and then sufficiently subjected to nitrogen purging, after which the contents of the system were heated to 170° C. while stirring under a small nitrogen stream. Next, 13896 g (102.0 mol, 0.994 as a charged molar ratio) of meta-xylylenediamine was added dropwise under stirring, and the temperature inside the system was continuously increased while removing condensed water that was produced to outside of the system. After the completion of dropwise addition of the meta-xylylenediamine, the reaction was continued for 40 minutes at an internal temperature of 260° C. Subsequently, the inside of the system was pressurized with nitrogen, and the obtained polymer was removed from the strand die and pelletized to obtain approximately 24 kg of polyamide.

Next, the polyamide was inserted into a jacketed tumble dryer provided with a nitrogen gas introduction tube, a vacuum line, a vacuum pump, and a thermocouple for measuring the internal temperature, and the inside of the tumble dryer was sufficiently purged with nitrogen gas having a purity of 99 vol % or higher while the tumble dryer was rotated at a constant speed, after which the tumbler dryer was heated under the same nitrogen gas stream, and the pellet temperature was increased to 150° C. over approximately 150 minutes. When the pellet temperature reached 150° C., the pressure inside the system was reduced to 1 torr or less. Heating was once again continued, and after the pellet temperature was increased to 200° C. over approximately 70 minutes, the temperature was maintained at 200° C. for 30 to 45 minutes. Next, nitrogen gas having a purity of 99 vol % or higher was introduced into the system, and the tumble dryer was cooled while being rotated, and a polyamide resin (Y1) was obtained. The terminal amino group concentration was measured, and was found to be 14.4 μmol/g.

Manufacturing of Polyamide Resin Mixture by Masterbatch Method

Manufacturing Example 2

An amount of 98.8 mass % of the polyamide resin (Y1), 0.6 mass % of Blue RR as the yellowing inhibitor (A), and 0.6 mass % of Violet 3R as the greening inhibitor (B) were dry blended in advance. Next, the dry blended mixture was melt-kneaded at 260° C. using a twin-screw extruder (TEM26SX available from Toshiba Machine Co., Ltd.), and masterbatch pellets were obtained. Subsequently, the pellets were dried in a vacuum dryer at 150° C. for 5 hours, and a masterbatch A was obtained.

Next, a polyamide resin mixture was prepared by mixing the obtained masterbatch A and the remaining poly amide resin (Y1) at a mass ratio of 10/90 (masterbatch A/remaining polyamide resin=10/90).

Manufacturing Example 3

A masterbatch B was obtained in the same manner as in Manufacturing Example 2 with the exception that the blending ratios were changed to 99.2 mass % for the polyamide resin (Y1). 0.4 mass % for the Blue RR as the yellowing inhibitor (A), and 0.4 mass % for the Violet 3R as the greening inhibitor (B).

Next, a polyamide resin mixture was prepared by mixing the obtained masterbatch B and the remaining polyamide resin (Y1) at a mass ratio of 10/90 (masterbatch B/remaining polyamide resin=10/90).

Manufacturing Example 4

A masterbatch C was obtained in the same manner as in Manufacturing Example 2 with the exception that the blending ratios were changed to 98.8 mass % for the polyamide resin (Y1). 0.6 mass % for the Blue 690 as the yellowing inhibitor (A), and 0.6 mass % for the Violet 3R as the greening inhibitor (B).

Next, a polyamide resin mixture was prepared by mixing the obtained masterbatch C and the remaining polyamide resin (Y1) at a mass ratio of 10/90 (masterbatch C/remaining polyamide resin=10/90).

Manufacturing Example 5

A masterbatch D was obtained in the same manner as in Manufacturing Example 2 with the exception that the blending ratios were changed to 98.0 mass % for the polyamide resin (Y1), 1.0 mass % for the Blue RR as the yellowing inhibitor (A), and 1.0 mass % for the Violet 3R as the greening inhibitor (B).

Next, a polyamide resin mixture was prepared by mixing the obtained masterbatch D and the remaining polyamide resin (Y1) at a mass ratio of 10/90 (masterbatch D/remaining polyamide resin=10/90).

Manufacturing Example 6

A masterbatch E was obtained in the same manner as in Manufacturing Example 2 with the exception that the blending ratios were changed to 99.6 mass % for the polyamide resin (Y1), 0.2 mass % for the Blue RR as the yellowing inhibitor (A), and 0.2 mass % for the Violet 3R as the greening inhibitor (B).

Next, a polyamide resin mixture was prepared by mixing the obtained masterbatch E and the remaining polyamide resin (Y1) at a mass ratio of 10/90 (masterbatch E/remaining polyamide resin=10/90).

Multilayer Container

Examples 1 to 4 and Comparative Examples 1 to 4 (Manufacturing of Multilayer Containers)

<Preform Molding>

An injection molding machine (model DU130CI, available from Sumitomo Heavy Industries, Ltd.) having two injection cylinders, and a two-piece mold (available from Kortec, Inc.) were used, and the polyester resin listed in Table 1 was injected from one injection cylinder, the polyamide resin mixture listed in Table 1 was injected from the other injection cylinder, and under the conditions presented below, a three-layer preform (25 g equivalent setting per preform) formed from a polyester layer/polyamide layer/poly ester layer was injection molded and manufactured such that the mass of the polyamide layer relative to the entire preform was as described in Table 1. The shape of the preform included an overall length of 95 mm, an outer diameter of 22 mm, and a wall thickness of 4.0 mm. The molding conditions for the three-layer preform were as presented below.

Skin-side injection cylinder temperature: 285° C.
Core-side injection cylinder temperature (only for three-layer preform): 265° C.
Resin flow path temperature in the mold: 285° C.
Mold cooling water temperature: 15° C.
Cycle time: 40 seconds <Bottle Molding>

The preform obtained above was biaxially stretched and blow molded using a blow molding device (EFB1000ET, available from Frontier Inc.), and a bottle (hollow multilayer container) was obtained. The overall length of each bottle was 223 mm, the outer diameter was 65 mm, and the internal volume was 500 mL, and the bottom part was petaloid shaped. No dimples were provided in the trunk section. The biaxial stretching and blow molding conditions are as shown below.

Preform heating temperature: 103° C.
Stretching rod pressure: 0.7 MPa
Primary blow pressure: 1.1 MPa
Secondary blow pressure: 2.5 MPa
Primary blow delay time: 0.30 seconds
Primary blow time: 0.30 seconds
Secondary blow time: 2.0 seconds
Blow exhaust time: 0.6 seconds
Mold temperature: 30° C.

[Manufacturing of Recycled Polyester]
<Recovery and Granulation Step>

Ten kilograms of each of the hollow multilayer containers obtained in Examples 1 to 4 and Comparative Examples 1 to 4 were ground with a grinder having a mesh diameter of 8 mm, and the resulting flake-shaped ground product was recovered as recycled polyester.

The recovered recycled polyester was extruded and formed into a strand shape by a twin-screw extruder (TEM26SX, available from Toshiba Machine Co., Ltd.) at a heater temperature of 270° C. and a discharge rate of 20 kg/hr, and then cut with a pelletizer and formed into pellets while being cooled in a water tank. Note that air elutriation of the polyamide layer was not implemented.

<Crystallization/solid Phase Polymerization Step>

The pellets obtained in the granulation step were heated at 200° C. for 7 hours under vacuum conditions with the pressure reduced to 1 torr or less. The pellets were removed after the heating treatment, and the yellow chromaticity $\Delta b^*$ was evaluated. The results are shown in Table 1.

[Measurement Method]

<$L^*$ Value>

A trunk portion at a height of from 5 to 9 cm from the bottom portion of the bottle (multilayer container) obtained in each of the examples and comparative examples was cut out and measured using the haze meter COOH400 (available from Nippon Denshoku Industries Co., Ltd.) in accordance with JIS K 7105, and the $L^*$ value of the trunk portion of the bottle was measured.

<$b^*$ Value>

A trunk portion at a height of from 5 to 9 cm from the bottom portion of the bottle (multilayer container) obtained in each of the examples and comparative examples was cut out and measured using the haze meter COOH400 (available from Nippon Denshoku Industries Co., Ltd.) in accordance with JIS K 7105, and the $b^*$ value of the trunk portion of the bottle was measured.

Note that the $b^*$ value represents the chromaticity. A $+b^*$ represents a yellow direction, and a $-b^*$ represents a blue direction. As the $b^*$ value becomes larger and the absolute value of the $b^*$ value becomes smaller, blueness decreases, and the multilayer container further excels in colorless.

<Blueness Sensory Evaluation>

In a room illuminated with white lighting, a bottle (multilayer container) obtained in each of the examples and comparative examples was placed upright on a white paper, a white paper was erected at a position of 10 cm behind the bottle, the bottle was visually observed from the facing surface of the erected white paper, and the blueness of the bottle was evaluated on the basis of the following criteria.

A: Blueness was not sensed.
B: Blueness was sensed.
C: Significant blueness was sensed.

<Yellow Chromaticity $\Delta b^*$>

The yellow chromaticity $\Delta b^*$ of recycled polyester pellets obtained in the [Manufacturing of recycled polyester] was measured according to the following method and evaluated by the following criteria.

In accordance with JIS Z 8722, the pellets were poured into a 30 mm$\varphi$ cell container, and the color tone of the pellets was measured four times by the reflection method using the color difference meter ZE-2000 (a 12 V, 20 W halogen lamp light source available from Nippon Denshoku Industries Co., Ltd.), and the average value thereof was determined and used as the color tone.

Note that the $b^*$ value represents the chromaticity. A $+b^*$ represents a yellow direction, and a $-b^*$ represents a blue direction. Also, a smaller absolute value of the $\Delta b^*$ value means a greater suppression of yellowing and higher colorlessness. The $\Delta b^*$ value indicates a difference between the $b^*$ value of a sample (recycled polyester recovered from a bottle) from the examples and comparative examples and the $b^*$ value of the polyester resin alone, subjected to the same treatment as in the examples and comparative examples.

TABLE 1

|  |  |  | Example 1 | Example 2 | Example 3 | Example 4 | Comparative Example 1 | Comparative Example 2 | Comparative Example 3 | Comparative Example 4 |
|---|---|---|---|---|---|---|---|---|---|---|
| Polyamide resin misture | Manufacturing Example No |  | 2 | 3 | 4 | 2 | 2 | 5 | 6 | 6 |
|  | Masterbatch code |  | A | B | C | A | A | D | E | E |
|  | Polyamide resin for masterbatch (mass %) | Polyamide resin (Y1) | 9.88 | 9.92 | 9.88 | 9.88 | 9.88 | 9.80 | 9.96 | 9.96 |
|  | Yellowing ininbitor (mass %) | Blue RR | 0.06 | 0.04 | — | 0.06 | 0.06 | 0.10 | 0.02 | 0.02 |
|  |  | Blue 690 | — | — | 0.06 | — | — | — | — | — |
|  | Greening inhibitor (mass %) | Violet 3R | 0.06 | 0.04 | 0.06 | 0.06 | 0.06 | 0.10 | 0.02 | 0.02 |
|  | Polyamide resin (Y1) (mass %) |  | 90 | 90 | 90 | 90 | 90 | 90 | 90 | 90 |
|  | Total (mass %) |  | 100 | 100 | 100 | 100 | 100 | 100 | 100 | 100 |
| Multilayer container | Polyamide layer | Polyamide resin mixture (mass %) | 2.5 | 3.5 | 2.5 | 2.5 | 2.5 | 2.5 | 2.5 | 2.5 |
|  |  | (Yellowing inhibitor amount therein) (ppm) | 600 | 400 | 600 | 600 | 600 | 1000 | 200 | 200 |
|  | Polyester resin (mass %) in polyester layer | 8912 | 97.5 | 96.5 | 97.5 | — | — | 97.5 | 97.5 | — |
|  |  | BK2180 | — | — | — | 97.5 | — | — | — | — |
|  |  | 1101 | — | — | — | — | 97.5 | — | — | 97.5 |
|  | Total (mass %) |  | 100 | 100 | 100 | 100 | 100 | 100 | 100 | 100 |
| Evaluation of multilayer container |  | $L^*$ | 89.5 | 89.8 | 89.0 | 91.5 | 85.2 | 86.6 | 92.1 | 88.2 |
|  |  | $b^*$ | −2.67 | −2.51 | −2.75 | −1.52 | −5.31 | −4.75 | −1.15 | −3.70 |
|  |  | Blueness sensory evaluation | A | A | A | A | B | B | A | A |
| Evaluation of recycled polyester |  | Yellow chromaticity $\Delta b^*$ | 0.1 | 2.1 | 0.2 | 0.1 | 0.2 | 3.0 | 2.6 | 2.9 |

As shown in Table 1, it is clear that the multilayer container of the present invention exhibits minimal blueness and excellent colorlessness, and that a recycled polyester obtained from the multilayer container through recycling exhibits minimal yellow chromaticity and excellent colorlessness.

On the other hand, it is also clear that the multilayer container of Comparative Example 1 for which the L* value of the multilayer container was less than 87.5, and the multilayer container of Comparative Example 2 for which the content of the yellowing inhibitor (A) exceeded 800 ppm in relation to the polyamide layer both exhibited blueness and were inferior in terms of colorlessness. It is also clear that with the multilayer containers of Comparative Examples 3 and 4 in which the content of the yellowing inhibitor (A) was less than 400 ppm in relation to the polyamide layer, the yellow chromaticity of the recycled polyester obtained from the multilayer containers through recycling was high, and the colorlessness was inferior.

The invention claimed is:

1. A multilayer container comprising:
a polyester layer containing a polyester resin (X); and
a polyamide layer containing a polyamide resin (Y) and a yellowing inhibitor (A),
wherein
a content of the polyamide resin (Y) is from 0.05 to 7.0 mass % relative to a total amount of all polyamide layers and all polyester layers,
the yellowing inhibitor (A) is a dye,
the content of the yellowing inhibitor (A) is from 400 to 800 ppm relative to the polyamide layer, and
an L* value of the multilayer container is 87.5 or greater.

2. The multilayer container according to claim 1, wherein the polyester resin (X) comprises a constituent unit derived from a dicarboxylic acid and a constituent unit derived from a diol, 80 mol % or more of the constituent unit derived from a dicarboxylic acid being a constituent unit derived from terephthalic acid, and 80 mol % or more of the constituent unit derived from a diol being a constituent unit derived from ethylene glycol.

3. The multilayer container according to claim 1, wherein the polyamide resin (Y) comprises a constituent unit derived from a diamine and a constituent unit derived from a dicarboxylic acid, 80 mol % or more of the constituent unit derived from a diamine being a constituent unit derived from xylylene diamine, and 80 mol % or more of the constituent unit derived from a dicarboxylic acid being a constituent unit derived from adipic acid.

4. The multilayer container according to claim 1, wherein the yellowing inhibitor (A) is an anthraquinone-based dye.

5. The multilayer container according to claim 1, wherein the polyamide layer further contains a greening inhibitor (B).

6. The multilayer container according to claim 5, wherein the greening inhibitor (B) is at least one selected from the group consisting of anthraquinone-based dyes and azo-based dyes.

7. The multilayered container according to claim 1, wherein the polyester layer substantially does not contain a reheating agent.

8. The multilayer container according to claim 1, wherein the multilayer container is a hollow multilayer container.

9. The multilayer container according to claim 1, wherein the multilayer container has a 2 to 5 layer structure, and an outermost layer is a polyester layer.

10. The multilayer container according to claim 1, wherein the multilayer container has a 3 to 5 layer structure, and the outermost layer and the innermost layer are polyester layers.

11. A method for manufacturing a multilayer container, the multilayer container having
a polyester layer containing a polyester resin (X), and
a polyamide layer containing a polyamide resin (Y) and a yellowing inhibitor (A),
a content of the polyamide resin (Y) being from 0.05 to 7.0 mass % relative to a total amount of all polyamide layers and all polyester layers,
the yellowing inhibitor (A) being a dye,
a content of the yellowing inhibitor (A) being from 400 to 800 ppm relative to the polyamide layer, and
an L* value of the multilayer container being 87.5 or greater,
the method comprising:
Step 1: mixing the polyamide resin (Y) and the yellowing inhibitor (A) to prepare a polyamide resin mixture;
Step 2: co-injection molding the polyamide resin mixture and a polyester resin composition containing the polyester resin (X), and thereby obtaining a multilayer preform; and
Step 3: blow molding the multilayer preform.

12. The method according to claim 11, wherein in step 1, the polyamide resin (Y) having a pellet shape and the yellowing inhibitor (A) are mixed at a temperature of 230° C. or lower.

13. The method according to claim 11, wherein in step 1, a greening inhibitor (B) is further mixed.

14. The method according to claim 13, wherein in step 1, the polyamide resin or polyester resin, the yellowing inhibitor (A), and the greening inhibitor (B) are kneaded, and then mixed with the polyamide resin (Y).

15. The method according to claim 11, wherein the yellowing inhibitor (A) is a powder, a dispersion, or a solution.

16. A method for manufacturing a recycled polyester, the method comprising recovering polyester from the multilayer container according to claim 1.

17. The method according to claim 16, wherein one or more steps selected from crystallization and solid phase polymerization are implemented after recovering the polyester.

* * * * *